O. L. KELLETT.
HYDRAULIC MOTOR FOR DENTAL ENGINES.
APPLICATION FILED DEC. 4, 1908.
959,352.
Patented May 24, 1910.
2 SHEETS—SHEET 1.
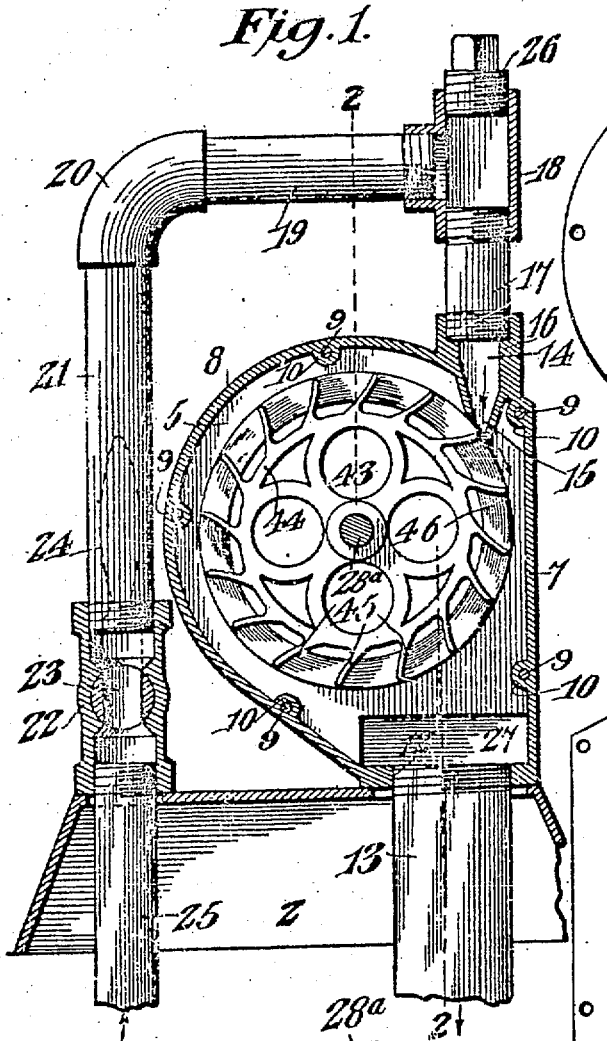
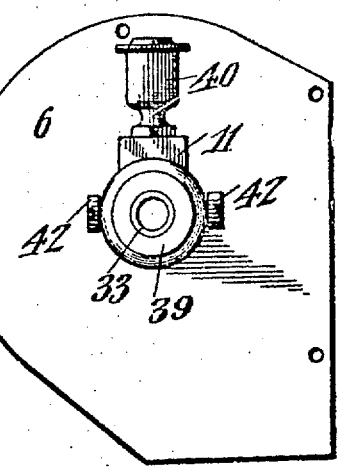
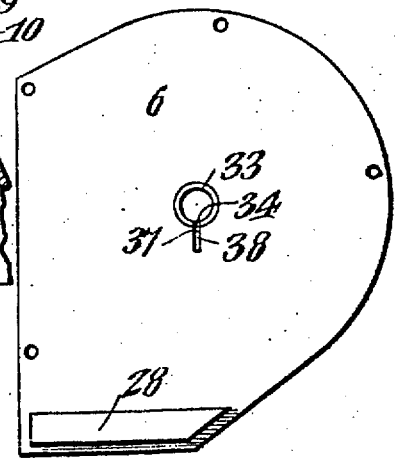
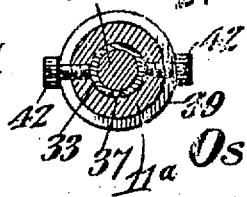
Oscar L. Kellett, Inventor
Witnesses

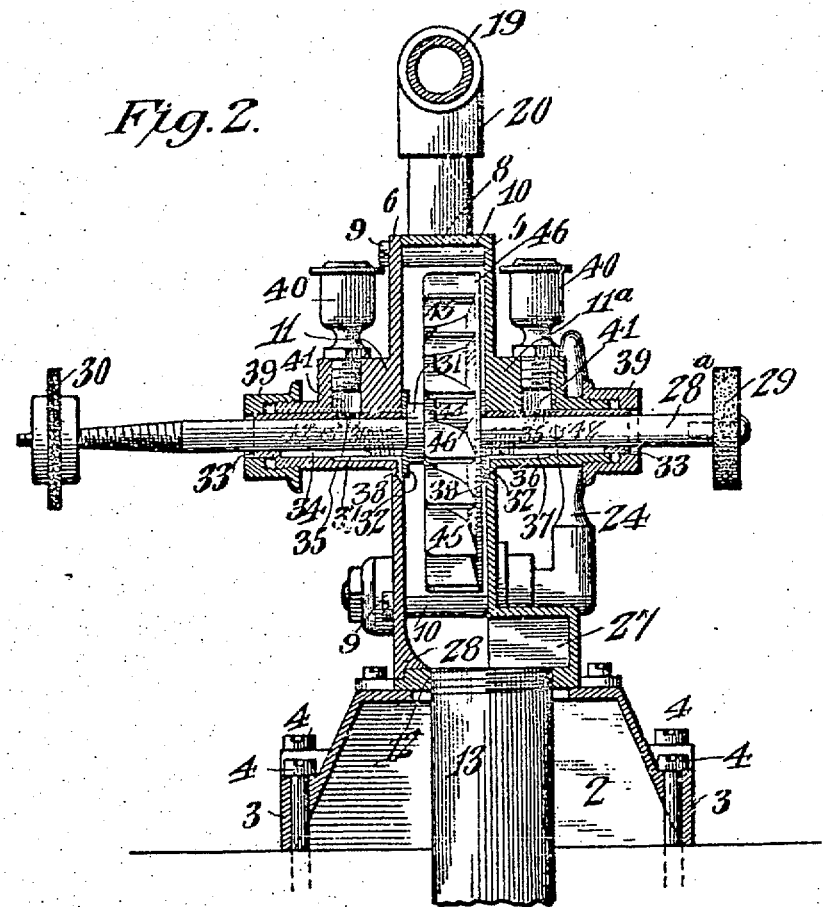

UNITED STATES PATENT OFFICE.

OSCAR L. KELLETT, OF WEST PLAINS, MISSOURI.

HYDRAULIC MOTOR FOR DENTAL ENGINES.

959,352.

Specification of Letters Patent.   Patented May 24, 1910.

Application filed December 4, 1908.   Serial No. 465,997.

*To all whom it may concern:*

Be it known that I, OSCAR L. KELLETT, a citizen of the United States, residing at West Plains, in the county of Howell and State of Missouri, have invented a new and useful Hydraulic Motor for Dental Engines, of which the following is a specification.

My invention relates more particularly to motors which are to be used for driving dental machinery, and particularly to motors which are designed to be driven by a stream of water and which carry upon their spindles opposed buffing or polishing wheels. This is the application of my motor which I have illustrated, but it will be understood that the shaft of the motor may be used for actuating other devices of any character to which it is applicable.

The object of my invention is to provide a motor of extremely simple construction wherein there shall be no back splashing of the water which will act to retard the rotation of the rotor, wherein the water shall be applied to the blades of the rotor at a point best fitted to secure its maximum energy, and wherein the blades readily free themselves.

Further objects of my invention reside in the means whereby escape of water is prevented from the bearings of the rotor shaft, and the particular construction of the rotor shaft and its bearings whereby the bearings may be tightened upon the shaft and properly lubricated.

The invention consists in the details of construction and arrangement of parts set forth in the accompanying specification and specifically stated in the claims appended.

In the drawings, Figure 1 is a side elevation of my motor, the casing being in section; Fig. 2 is a transverse vertical section of the same on the line 2—2 of Fig. 1; Fig. 3 is an outside face view of the side of the casing detached; Fig. 4 is an inside face view of the plate shown in Fig. 3; Figs. 5 and 6 are detail views of opposite sides of the bearing sleeve; Fig. 7 is a section of the bearing showing the bearing sleeve in position.

In the drawing, 2 designates a base of any suitable construction, preferably having inclined sides and preferably hollow, the base being provided with lugs, 3, through which pass screws 4 for attaching the base to any table. Supported upon the upper face of the base at one end thereof is a rotor casing having the two sides 5 and 6, the end wall 7 and the curved wall 8. Preferably, as shown in Fig. 2, the side wall 6 and the walls 7 and 8 are all cast in one piece, while the side plate 5 is formed separately from the remainder of the casing and is attached thereto by screws 9 which pass through the sleeves 10 formed as part of the sides 8 and 7.

The side plate 5 is formed with an outwardly projecting journal box 11ª, and the side plate 6 is formed with a like journal box 11 for the support of the rotor shaft. The base of the rotor casing is formed with the opening, 12, into which is screwed the outlet pipe 13. The upper end of the rotor casing is provided with inlet opening 14 having an inwardly-extending nozzle 15, contracted in area near its outlet. The inlet nozzle is formed by the walls of a tubular extension 16 into which is screw threaded a tubular connection 17, which, at its other end, is threaded into a tee 18. The side opening of the tee is connected to a length of pipe 19, an elbow 20 and a length of pipe 21, which, at its lower end is screw threaded into a valve casing 22 having therein any suitable controlling valve 23. This valve is shown as a rotatable valve actuated by a valve handle 24. To the inlet end of the valve casing 22 is connected the inlet water pipe 5 leading from any suitable source of supply. In the upper end of the tee 18 is inserted a plug 26 having a square hub whereby it may be readily unscrewed to permit the insertion of a cleaning tool into the inlet opening and nozzle.

It will be seen from Fig. 2 that the rotor casing at its lower end is formed with a laterally-extending chamber 27, and that the side plate 6 at its lower end is formed with an inwardly-projecting fillet 28 having an inclined face which acts to direct the outflowing water from the rotor laterally toward the chamber 27. This chamber 27 acts, as will be more fully described later on, to prevent the back splashing of the water which would otherwise tend to retard the rotor. It will be seen also from Fig. 2 that the rotor chamber formed by the casing is not exactly over the middle of the outlet pipe 13, but is over one side of the outlet pipe and is, therefore, out of register to some extent therewith. Thus the back action of the water which passes through the pipe 13 will not act directly upon the rotor, but the main back pressure of this water will come against the upper wall of the chamber 27. Though the pipe 13 is offset somewhat from the vertical plane passing through the rotor chamber, yet it is not offset so far as will prevent the easy discharge of the water from the wheel or rotor.

28* designates the spindle or shaft of the rotor which passes entirely through the walls of the casing and through the journal box thereon and is shown as carrying at its ends the buffing or grinding wheels 29 and 30, it being obvious, however, that other tools might be applied to the spindle 28*.

The wheel is provided with a central hub 31, which is made fast to the shaft in any desired manner, and surrounding the shaft at both ends of the hub are the washers 32. Surrounding the shaft outside of the washers are the sleeves 33 shown in detail in Figs. 5 and 6.

As will be seen from Fig. 5, the sleeve is slotted at its underside, 34, for almost its entire distance. The upper face of the sleeve is provided with a series of slots 35 somewhat inclined. The inner end of the sleeve is provided with a series of semicircular slots 36, which intersect the longitudinal slot 34, the slots being inclined outward from the slot 34, as seen in Fig. 5.

As will be seen from Fig. 2, the inner ends of the journal box 11 are provided with a longitudinal groove 37 extending from the inner face of each side plate outward about half the length of the journal boxes. The inner faces of each of the side plates 6 are also provided with a downwardly-extending groove 38, as shown in Fig. 4, which is in register with the groove 37 and with the slot 34 in the sleeve.

It will be seen from Fig. 2 that the sleeves 33 are longer than the boxes 11* and 11, and project beyond the same, this being for the purpose of permitting the sleeve to be readily withdrawn and new sleeves inserted when the sleeves have become worn. The end of the boxes 11* and 11 is each closed by a cap, 30, which is screw-threaded upon the ends of the box and contacts with the outer end of the sleeve. The upper portion of each box 11* and 11 is provided with the oil cups 40, which have openings registering with passages 41 formed in the boxes, which in turn register with the slots 35 in the sleeve 33, thus providing for the lubrication of the shaft through the sleeves. Two opposed set screws, 42, pass through each box on opposite sides thereof and engage with the sleeve 33 on either side of the slot 34 so that when turned the sleeve may be tightened upon the shaft 28 to take up wear, the sleeve being held fixed with relation to the shaft by the engagement of these set screws and by the tight fit of the sleeve within the boxes 11* or 11. These sleeves form bushings which act to lubricate the shaft to provide a wearing surface and which also prevent water from passing out through the boxes. The passage of water through the boxes is prevented largely by the slots 36. Water which may enter between the bushings 33 and the washer 32 will be collected in the channels formed by the slots 36 and will flow downward into the longitudinal groove 37 and out through the downwardly extending slot 38 and thus enter into the rotor casing again to pass out with the outflow of water therefrom. It will be seen that the bushings or sleeves 33 and the parts connected therewith provide a bearing for the shaft, provide a bearing which is adjustable to prevent any loose running of the shaft, and act not only to lubricate the shaft properly, but prevent any outflow of water through the journal bearings. At the same time, the bushings may be easily withdrawn and easily replaced when desired.

The water wheel or rotor 43 is formed in any desired manner but is preferably cast in one piece upon the hub 31. The spider forming the web of the wheel is open so as to afford the least engagement with the water possible and is provided at its circumference with the ring 44 having the laterally-projecting blades 45, which, at their other ends are formed in one piece with a ring 46. It will be seen from Fig. 2 that the water wheel or rotor constructed as above described is hollow, that the blades have no bottom webs between them, or, in other words, that no pockets are formed upon the circumference of the wheel and that, therefore, the wheel being open, moves with as little resistance as possible through the water and that there is, therefore, no back action of the water on the wheel.

As will be seen from Fig. 1, the blades 45 are set at such an angle to the radii of the wheel that they will be presented to the nozzle 15 in a plane substantially at right-angles to the axis of the nozzle. Or, expressed in another way, the fluid impinging faces of the blades are disposed at an obtuse angle to the periphery of the ring 44. To secure this result, each blade is set or made at an angle of about 10° to a radial line drawn through the center of the axis of the wheel, and the base of the blades. The nozzle 15 does not occupy the middle of the casing vertically above the axis of the rotor, but is set at one corner thereof at an angle of about 50° with a vertical line drawn through the axis of the rotor. This combination secures, as will be seen from Fig. 1, that the blades move under the nozzle at substantially right-angles therewith and that the whole force of the water therefore is directed against the blades at the point where the water leaves the nozzle, and that, as the blades pass downward, they clear themselves, while, at the same time, the water is applied at the extreme edge of the blades when they first register with the nozzle and thus get the greatest amount of power from the water. The base of the blades being hollow, that is, not provided with any bottom webs which would act as buckets, there is no back rushing of the water tending to retard the rotation of the wheel. Another point of advantage resulting from the blades being bottomless and the rotor being hollow, taken in conjunction with the peculiar setting of the blades, is that when the blades in their course arrive about the outlet pipe, 13, they are substantially vertical and that thus the back pressure of water in the pipe 13 or back splash thereof will not act upon the surface of the blades to retard the movement of the rotor. It will be seen that a maximum of surface is provided at the nozzle and a minimum of surface at the outlet. It will also be seen that the outlet 13 is arranged directly beneath the inlet 14 and that thus the water passes directly downward and not in any circuitous path.

As before stated, the pipe 13 is greater in diameter than the thickness of the rotor casing and the water passing downward from the nozzle 15 will be directed laterally by the fillet 28 into the pipe 13 and into the chamber 27. Any backward pressure of the water in the pipe 13 or any bubbling or splashing of this water in its escape will not affect the wheel, as the water will be directed into the lateral chamber, 27, and the pressure will be received against the walls thereof and not against the wheel itself.

As noted above, the wheel, with its blades and the two rings, 46 and 44, is formed in one piece. The ring 46, which is adjacent to the inner face of the plate 5, may be surfaced in any suitable manner, as in a lathe, in order to provide a smooth face to the wheel at the side of it which is nearest to contact with the casing. The remainder of the wheel requires no surfacing, but may be used as it is cast. This is an important point in the economical manufacture of my device.

The advantages of my invention are obvious from what has been before described. The wheel is intended to rotate at a very high speed, from 1800 to 2000 revolutions per minute, and hence, must be so constructed that it will run absolutely true and so that the wheel will clear itself of water; that there shall be no back pressure of water, but that the water will be discharged immediately that it leaves the wheel. It is also necessary in wheels running at this speed for small motors that they shall be as skeletonic as possible, with the least possible contact with the water. These objects are achieved by my construction. The device is simple and compact, may be easily connected to suitable inlet and discharge pipes, may be run at high speed without heating, and with a degree of steadiness not heretofore attainable.

From the foregoing, it is thought that the construction, operation and many advantages of the herein described invention will be apparent to those skilled in the art without further description, and it will be understood that various changes in the size, shape, proportions and minor details of construction may be resorted to without departing from the spirit or sacrificing any of the advantages of this invention.

Having thus described my invention, what I claim as new and desire to secure by Letters-Patent, is:

1. In a motor, the combination of a casing, a wheel rotatably mounted therein and including a pair of rings, and blades secured to the rings with the spaces between adjacent blades open at the top and bottom and also at one side, a nozzle disposed with its axis approximately tangentially to the wheel to discharge fluid against the blades, and an outlet conduit disposed under the wheel and nozzle.

2. In a motor, the combination of a casing, a wheel mounted therein including a plurality of peripheral blades, and a ring disposed inwardly from the blades and connected with the inner corners thereof and also including a second ring secured to all the blades at one side, the fluid impinging faces of the said blades being arranged at an obtuse angle to the periphery of the first ring, a nozzle in the casing arranged to discharge fluid against the blades, and an outlet conduit arranged under the nozzle and wheel.

3. In a motor, a casing having opposed inlet and outlet openings, a wheel located in said casing below the inlet opening, the axis of the outlet opening of the casing being in line with one face of the wheel said opening being laterally larger than the width of the wheel extending beneath the same but having its axis offset to the vertical plane of the wheel.

4. In a motor, the combination of a casing having inlet and outlet openings and formed with a flat wall disposed in a plane approximately coincident with the diameter of the outlet opening, an offset chamber in the said side wall communicating with the outlet opening, with a wheel rotatably mounted in the casing, said wheel consisting of a spider formed with a peripheral ring, blades having their inner portions secured to the ring and disposed with their fluid impinging faces at an obtuse angle to the periphery of the ring, and a second ring disposed in proximity to the said flat wall of the casing and secured to the edges of the blades only at one side thereof.

5. In a motor, the combination of a casing, a nozzle mounted therein, a discharge conduit disposed opposite the nozzle, and a wheel arranged in the casing in coöperative relation with the nozzle and outlet conduit, said wheel comprising a body, a plurality of outwardly-extending blades projecting from the periphery of the body and having their inner edges integrally connected therewith, a ring separate from the body and located out of the plane thereof and integrally connected with the blades at the side edges thereof.

6. In a motor casing having two parallel sides, a vertical end wall and a circular wall opposed to the vertical wall, the lower portion of the circular wall extending diagonally downward to the bottom of the casing, said casing having an inlet opening adjacent to the upper end of the straight end wall, and an outlet opening adjacent to the lower end of the straight end wall, a bladed rotor mounted within the casing having its circumference in line with the inlet opening, said rotor comprising an open frame with blades projecting outwardly in the direction of movement at an angle to the radii of said rotor, said blades having their fluid impinging faces disposed at an obtuse angle to the periphery of the rotor, and the spaces between adjacent blades being open between the bottom edges of the latter and also at the side and outer edges.

7. In a motor, a casing having an upper inlet opening and a lower outlet opening and a rotor mounted in said casing having an open frame and having blades on its circumference, a ring carrying the blades, and a second ring of larger diameter than the first and carried by and connected with the blades at one side thereof, the bottoms of said blades being disconnected from each other, said blades being inclined in the direction of movement of the rotor, each at an angle to a radial line through the shaft of the rotor and through the base of said blade, the axis of the outlet opening being nearer to the plane of the shaft of the rotor than the axis of the inlet opening and the outlet opening being of larger diameter than the inlet opening.

8. In a motor, a casing having an inlet nozzle at its upper end and a rotor mounted in said casing with its blades adapted to project beneath said nozzle, the lower end of said casing beneath the rotor being laterally extended only at one side and having an outlet opening therethrough, said opening being larger than the width of the rotor casing but extending partly beneath the same to partly register therewith, and a deflecting means arranged within the casing on the wall opposite from the laterally-extended portion thereof.

9. In a motor, a casing having an inlet nozzle extending into the casing at one side thereof, a rotor centrally mounted in said casing provided with circumferential blades adapted to be carried beneath the nozzle, the lower end of said casing being formed with a laterally-extended chamber having an outlet opening therethrough located beneath the casing and beneath the lateral extension thereof, the side of said casing opposed to the chamber or lateral extension being provided with a fillet adapted to direct the motive fluid into said chamber as it leaves the rotor.

10. In a water motor, a casing having opposed journal boxes, a wheel having a spindle carried in said journal boxes, a bushing located within each of the journal boxes and surrounding the spindle, said bushings being each provided with a series of transverse water conducting slots and each of the journals having a water conducting groove formed therein intersected by the slots in said bushings and leading to the interior of the casing.

11. In a water motor, a casing having opposed journal boxes, a rotor mounted within the casing having a spindle carried in said journal boxes, and bushings carried by the journal boxes and surrounding the spindle, each of said bushings being provided with a series of water conducting transverse slots, alining with water conducting grooves in the journal boxes and each of said bushings being provided with slots alining with oiling passages in the journal boxes.

12. In a motor, a casing having opposed journal boxes each provided with an oil cup and passages leading from the oil cup to the center of the journal boxes, a spindle mounted in the journal boxes, a rotor on the spindle within the casing, and bushings mounted within the journal boxes and surrounding the spindle on either side of the rotor, each of said bushings being split, provided on their upper sides with a series of slots alining with the oil openings in the journal boxes and at their inner ends with a series of water conducting slots, each registering with intersecting water conducting slots formed in the inner face of the journal bearing and leading to the interior of the casing.

13. In a motor, a casing having one side wall and the circumference thereof made in one piece and the other side wall detachable therefrom, a laterally-extending chamber formed at the bottom of the first-named side wall, an inwardly-extending fillet formed at the bottom of the second side wall in line with the laterally-extending chamber, an outlet pipe connected to the bottom of said casing partially beneath the chamber and partially beneath the casing, an inlet nozzle extending into the casing at the upper end thereof in alinement with the outlet pipe, a rotor mounted within the casing to one side of the inlet nozzle, having blades extending outward in the direction of movement at an angle to the radii of said rotor, the ends of said blades being adapted to register with the opening of the nozzle, journal boxes formed on the sides of said casing, and means within the journal boxes for preventing the outflow of water from the casing therethrough.

14. In a motor, the combination of a casing having a nozzle, with a bladed rotor in the casing comprising a spider, a ring carried by the periphery thereof, blades arranged with their corresponding side edges flush with the spider and ring and integrally connected with the latter at the corners of the blades, and a ring connected with the side edges of the blades opposite from the first-mentioned side edges and wholly carried by the blades.

In testimony, that I claim the foregoing as my own, I have hereto affixed my signature in the presence of two witnesses.

OSCAR L. KELLETT.

Witnesses:
F. M. KELLETT,
M. T. HARLIN.